United States Patent [19]

Ishii et al.

[11] Patent Number: 4,911,835

[45] Date of Patent: Mar. 27, 1990

[54] SEAWATER-DISSOLVED METAL COLLECTING SYSTEM

[75] Inventors: Shinichi Ishii, Yokohama; Takeaki Miyazaki, Tokyo; Hitoshi Hotta, Yokosuka; Yukihisa Washio, Yokohama, all of Japan

[73] Assignee: Japan Marine Science & Technology Center, Japan

[21] Appl. No.: 56,097

[22] Filed: May 29, 1987

[30] Foreign Application Priority Data

May 29, 1986 [JP] Japan .................. 61-122108

[51] Int. Cl.$^4$ .................. B01D 15/00; B01D 57/00
[52] U.S. Cl. .................. 210/170; 210/747; 210/242.1; 210/293
[58] Field of Search .................. 210/170, 242.1, 242.2, 210/242.3, 242.4, 291, 293, 747

[56] References Cited

U.S. PATENT DOCUMENTS

| 3,576,257 | 4/1971 | Yates .................. 210/242.3 |
| 3,923,649 | 12/1975 | Sparham et al. .................. 210/242.1 |
| 4,046,691 | 9/1977 | Irons .................. 210/242.1 |
| 4,565,627 | 1/1986 | Lagström et al. .................. 210/242.1 |
| 4,582,609 | 4/1986 | Hunter et al. .................. 210/170 |

FOREIGN PATENT DOCUMENTS

| 2835251 | 2/1980 | Fed. Rep. of Germany ... 210/242.1 |
| 55-8959 | 1/1980 | Japan .................. 210/242.2 |
| 56-31411 | 3/1981 | Japan .................. 210/170 |
| 59-165525 | 8/1984 | Japan . |
| 60-251905 | 12/1985 | Japan .................. 210/242.1 |

Primary Examiner—Richard V. Fisher
Assistant Examiner—Cynthia L. Nessler
Attorney, Agent, or Firm—Skjerven, Morrill, MacPherson, Franklin & Friel

[57] ABSTRACT

A semisubmersible system for collecting a desired material from the sea water includes a submersible collection chamber which is defined by a pair of non-porous, buoyant side walls, a pair of non-porous end walls, a porous top wall and a porous bottom wall. A quantity of collecting agent is contained in the collection chamber. The buoyancy force applied to the present system by the pair of buoyant side walls is so set to keep the collection chamber substantially at a predetermined depth from the sea surface, so that the sea water is permitted to move into and out of the collection chamber due to wave motion while keeping the collection chamber virtually stationary in the vertical direction. There is obtained a large relative motion between the sea water and the collection chamber so that a large quantity of sea water is brought into contact with the collecting agent, thereby allowing a useful material contained in the sea water to be collected by the collecting agent by adsorption or absorption.

8 Claims, 2 Drawing Sheets

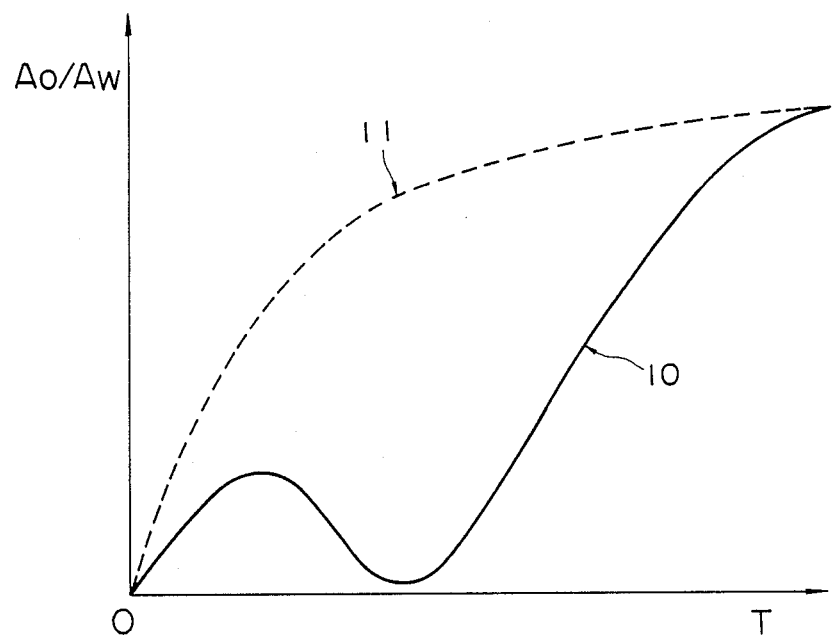

SEAWATER-DISSOLVED METAL COLLECTING SYSTEM

BACKGROUND OF THE INVENTION

1. Field of the Invention

This invention generally relates to a semisubmersible system for collecting a useful component present in sea water as dissolved therein, and, in particular, to a system for collecting a metal dissolved in sea water utilizing wave motion. More specifically, the present invention relates to a system for collecting a rare metal, such as uranium, which is dissolved in sea water.

2. Description of the Prior Art

Various useful components are dissolved in seawater, and rare metals, such as uranium, are also present in sea water as dissolved therein. However, since the concentration of any of such useful components present in sea water is so small, an enormous amount of sea water must be processed to collect such useful components from sea water. Besides, in order to make such a collecting operation economically feasible, use must be made of natural energy, such as tidal energy or wave energy. There has been proposed a system for collecting useful components from sea water utilizing wave motion as disclosed in the Japanese patent application No. 59-165525 (Patent Laid-Open Pub. No. 61-42392). According to this Application No. 59-165525, an adsorption unit including an adsorption chamber porous at top and bottom and containing therein a quantity of adsorbent is mounted at the bottom of a ship, whereby sea water moves through the adsorption chamber periodically and useful components present in the sea water are collected by the adsorbent.

In this case, the relative motion between the adsorption chamber and the sea water caused by wave motion is relied upon. However, since the adsorption unit is mounted at the bottom of a ship which floats at the sea surface, the adsorption unit tends to move up and down in phase with wave motion, so that the relative motion between the adsorption chamber and the sea water tends to be reduced. That is, the structure disclosed in the above-identified patent application No. 59-165525 is not efficient in utilization of wave motion in producing a relative motion between the adsorbent contained in the adsorption chamber and the sea water. It is important for sea water to pass through the adsorption chamber efficiently in order to obtain an enhanced collection efficiency of useful components, such as uranium, from sea water.

SUMMARY OF THE INVENTION

In accordance with the principle of the present invention, there is provided a system for collecting a useful component, such as a metal, from sea water, and the system includes a collection chamber defined by a closed-loop side wall, a porous top wall and a porous bottom wall. A quantity of collecting agent, such as an absorbent or adsorbent, for collecting a useful component from sea water by contact therewith is contained in the collection chamber. In the preferred embodiment, the useful material to be collected includes a metal, such as uranium. The collecting agent should have an average grain size which is larger than the pore size of the top and bottom walls so that the collecting agent is prevented from being discharged out of the collection chamber. In the preferred embodiment, the closed-loop side wall is non-porous so that no sea water passes therethrough. With this structure, sea water can pass through the collection chamber only through the top and bottom porous walls, which are preferably formed by a net having a predetermined mesh size so as to prevent the collecting agent from passing therethrough.

The collecting system also includes at least one submersible buoyancy unit. In the preferred embodiment, the submersible buoyancy unit defines part of the closed-loop side wall, and the submersible buoyancy unit is provided in the closed-loop side wall symmetrically with respect to the center of the side wall. In one embodiment, the closed-loop side wall is rectangular in shape and thus it has a pair of straight lateral wall sections and a pair of end wall sections, and each of the lateral wall sections is defined as the submersible buoyancy unit. The collecting system further includes supporting means extending upwardly from the closed-loop wall for supporting thereon a platform horizontally, on which any desired object, such as an operating device may be mounted. The supporting means includes a plurality of supporting columns which extend upwardly from the top of the closed-loop side wall. The overall weight of the collecting system is adjusted such that the water surface is located between the collection chamber and the platform when the collecting system is set in position with the submersible buoyancy units located underwater.

It is therefore a primary object of the present invention to obviate the disadvantages of the prior art as described above and to provide an improved system for collecting a useful material from sea water.

Another object of the present invention is to provide an improved system for collecting a useful material from sea water utilizing wave motion at high efficiency.

A further object of the present invention is t provide an improved system for collecting a desired material from sea water, which is high in efficiency, simple in structure and reliable in operation.

Other objects, advantages and novel features of the present invention will become apparent from the following detailed description of the invention when considered in conjunction with the accompanying drawings.

BRIEF DESCRIPTION OF THE DRAWINGS

FIG. 3 is graph useful for explaining the advantage of the present collection system.

DESCRIPTION OF THE PREFERRED EMBODIMENTS

Figure 1:
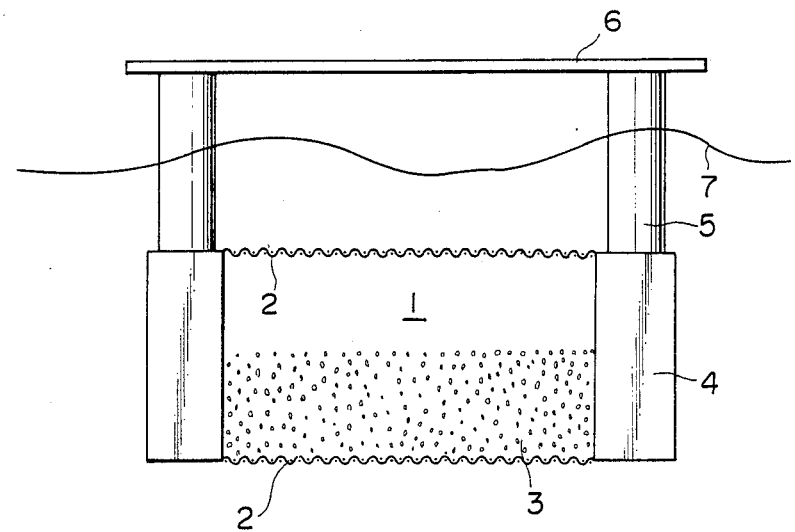
FIG. 1 is a schematic illustration showing a sea water-contained material collecting system constructed in accordance with the principle of the present invention.

Referring now to FIG. 1, there is schematically shown a system for collecting a desired material from sea water constructed in accordance with the principle of the present invention. As shown, the present collection system includes a collection chamber 1 which is located underwater in operation. The collection chamber 1 is defined by a closed-loop side wall, which includes a pair of lateral side wall sections 4, 4 and a pair of end wall sections 8, 8 in the illustrated embodiment (FIG. 2) and a pair of top and bottom porous walls 2, 2.

In the illustrated embodiment, the closed-loop side wall is rectangular in shape; however, the closed-loop side wall may take any other shape, such as a circular or cylindrical shape. In the illustrated embodiment, the pair of lateral side wall sections 4, 4 is defined as a submersible buoyancy unit, so that the lateral side wall sections 4, 4 are located underwater during operation, but they provide a buoyancy force to the system. The closed-loop side wall is non-porous so that no water passes therethrough. On the other hand, the top and bottom walls 2, 2 are porous and water may pass through the collection chamber 1 via these top and bottom walls 2, 2. In the preferred embodiment, the top and bottom porous walls 2, 2 are formed by a net having a predetermined mesh size.

Contained in the collection chamber 1 is a quantity of collecting agent 3, which may be either an adsorbent agent or an absorption agent. The collecting agent 3 should have an average grain size in relation to the pore size of the top and bottom walls 2, 2 such that the collecting agent 3 is prevented from being discharged out of the collection chamber 1. In the present invention, any desired amount of collecting agent 3 may be provided in the collection chamber 11 in accordance with specific requirements in various applications. For example, if the average grain size of the collecting agent 3 is sufficiently large as compared with the pore size of the top and bottom walls 2, 2 and there is provided a sufficient amount of interstices between the collecting agent 3 when packed, the collection chamber 1 may be substantially filled with the collecting agent 1. On the other hand, if the average grain size of the collecting agent 3 is relatively small, whereby there is provided little interstices when packed, though the average size of the collecting agent 3 is sufficiently large as compared with the pore size of the top and bottom walls 2, 2, the collecting chamber 1 should not be packed with the collecting agent 3 and there should be provided a free space so that the collecting agent 3 may move around within the collection chamber 1.

In the case when the average grain size of the collecting agent 3 is relatively large so that a sufficient amount of interstices between the grains is provided even when packed, sea water may move through the collection chamber 1 in both directions. That is, with the collection chamber 1 maintained substantially stationary underwater near the water surface, sea water moves through the collection chamber 1 up and down periodically, so that any useful material, such as a metal, contained or dissolved in the sea water comes into contact with the collecting agent 3, whereby the useful material comes to be collected by the collecting agent 3. The presence of such a useful material as a metal, e.g., uranium, in the sea water is very low in concentration, so that it is important that the sea water be brought into contact with the collecting agent 3 as efficiently as possible. In the case where the average grain size of the collecting agent 3 is relatively small so that a sufficient amount of interstices between the grains is not provided when packed, even though the average grain size of the collecting agent 3 is larger than the pore size of the top and bottom walls 2, 2, sea water may move through the collection chamber 1 only in one way, i.e., in the upward direction in FIG. 1. That is, in the structure shown in FIG. 1, when there is no wave motion, the collecting agent 3 is deposited on the bottom wall 2, thereby forming a layer. When the sea water moves upward owing to wave motion and comes int the collection chamber 1 through the bottom wall 2, the collecting agent 3 moves upward and becomes scattered in the collection chamber 1, thereby allowing the entering sea water to exit the collection chamber 1 through the top wall 2. When the sea water moves downward owing to wave motion, the collecting agent scattered in the collection chamber 1 comes to be again deposited on the bottom wall 2, thereby plugging the pores of the bottom wall 2 to prevent the sea water from going through the bottom wall 2. In this case, therefore, there should be provided enough free space in the collection chamber 1 so that the pores of the top wall 2 are not plugged by the collecting agent 3 when the sea water moves upward. Thus, the height of such a free space is preferably set to be substantially equal to or larger than the amplitude of the vertical motion of the sea water within the collection chamber 1. When so set, the collecting agent 3 is prevented from plugging the pores of the top wall 2.

The present collection system also includes a plurality of support columns 5 which extend upward from the top wall of each of the pair of lateral side wall sections 4, 4, each of which defines a submersible buoyancy unit. It is to be noted that the support columns 5 should be long enough to extend above the water surface 7 and that they have a total transverse cross-sectional area substantially smaller than that of the collection chamber. Also provided in the present collection system is a horizontal platform 6 which is supported by the plurality of support columns 5 to be located above the water surface 7. The platform 6 serves not only as a reinforcing member of the present collection system, but also as a table for supporting thereon any desired object. In the embodiment shown in FIG. 2, an operating or processing device is mounted on the platform 6. In FIG. 1, the platform 6 is in parallel with the top wall 2 and the overall weight of the present collection system is so adjusted that the water surface 7 is generally located between the platform 6 and the top wall 2.

Figure 2:
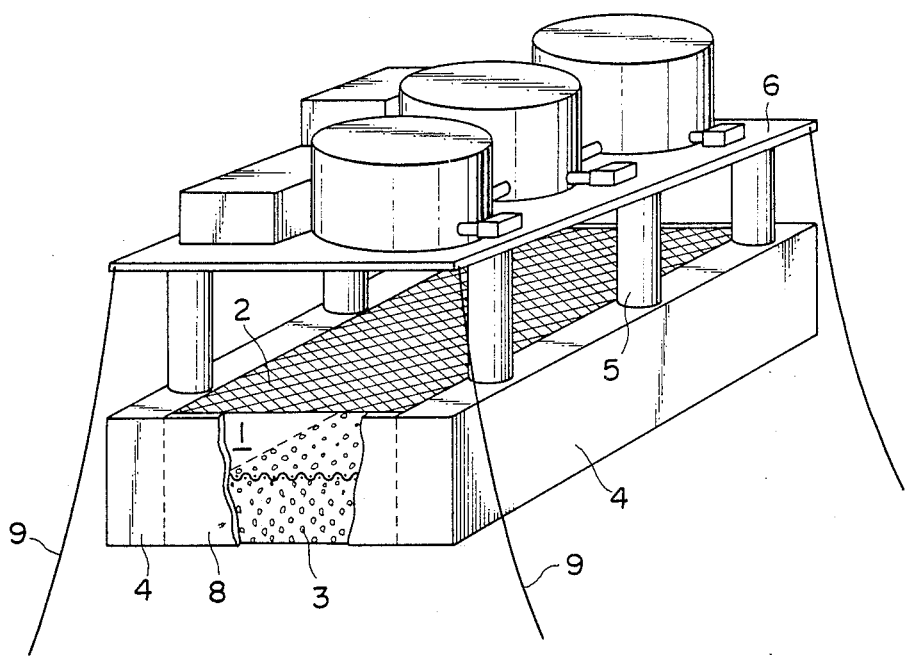
FIG. 2 is a perspective view showing schematically the overall structure of a sea water-contained material collecting system constructed in accordance with one embodiment of the present invention.

As shown in FIG. 2, a pair of end plates 8, 8 is provided as the end wall sections of the closed-loop side wall. Thus, the water inside of the collection chamber 1 is allowed to move only vertically and not horizontally. Such a structure is advantageous in keeping the collecting agent 3 uniformly distributed across the bottom wall 2 at all times. Thus, since the collecting agent 3 is uniformly distributed across the bottom wall 2, the resistance presented to the upwardly moving water due to wave motion is also uniform so that the flow of water through the collection chamber 1 may be maintained uniform. This is advantageous because the collecting agent 3 is insured to be used uniformly. In this connection, the collecting agent 3 preferably has a specific weight substantially equal to that of the sea water in which the present system is used. The collecting agent 3 preferably includes an adsorbent and/or absorbent agent which collects a desired material, such as a metal, by adsorption and/or absorption. The metal to be collected may be any metal present in the sea water, but it preferably includes such a rare metal as uranium.

Furthermore, as shown in FIG. 2, cables 9 are connected to the four corners of the platform 6 for mooring the present apparatus in position. The cables 9 may be connected to a fixing unit, such as an anchor. The buoyancy units 4 apply a buoyancy force to the present system and it is so set that the present system floats with the collection chamber 1 and the buoyancy units 4 submerged underwater. With this structure, the present system is maintained relatively stationary even if water waves move along the present system. That is, the collection chamber 1 is maintained substantially stationary, especially in the vertical direction, so that when the water moves up and down owing to wave motion, there is obtained a large relative motion between the sea water and the collection chamber 1 and thus the collecting agent 3 contained in the collection chamber 1. This is advantageous because the collecting agent 3 has an increased chance of contacting fresh sea water and thus of collecting more desired material from the sea water.

As described above, the present collection system is structured not to move up and down even if it is subjected to wave motion because of the presence of the pair of submersible buoyancy units 4, 4. Now, the motion of a floatable object in the vertical direction subjected to wave motion can be expressed by the following equation.

ti $M(d^2 \times dt^2) + N(dx/dt) + Cx = F$ where
M: mass of the floatable object;
N: damping force factor; and
C: wave external force.

With $F = F_a \sin wt$ and $x = x_a \sin(wt + e)$, the amplitude $x_a$ of the floatable object in the vertical direction may be expressed as follows:

$$x_a = Fa/((C - Mw^2)^2 + N^2 w^2)^{1/2}).$$

As a result, under the conditions of F being large, M being large and C being small, the amplitude $x_a$ becomes small so that the floatable object moves up and down very little.

FIG. 3 shows graphically the vertical movement response characteristic of a marine structure subjected to wave motion. In the graph of FIG. 3, the abscissa is taken for the wave period T and the ordinate is taken for the non-dimensionalized response amplitude corresponding to the amplitude $A_0$ of the vertical movement of the marine structure divided by the wave amplitude $A_w$. In the graph of FIG. 3, the solid curve 10 indicates the response characteristic of a marine structure of the semisubmersible type, i.e., the marine structure having a buoyancy unit submerged under water, and the dotted line 11 indicates the response characteristic of a marine structure of the floating type, i.e., the marine structure including a buoyancy unit floating at the water surface, such as an ordinary ship. It can be seen from FIG. 3 that the semisubmersible type marine structure has a reduced vertical motion when subjected to wave motion as compared with the floating type marine structure, such as an ordinary ship, over a wide and normal range of wave period which is present under normal sea weather conditions.

As a result, in accordance with the present invention, since there is provided a collection apparatus which corresponds to a semisubmersible type marine structure because the pair of submersible buoyancy units 4, 4 is provided and the collection chamber 1 is defined between these submersible buoyancy units 4, 4, the collection chamber 1 is kept substantially stationary in the vertical direction even if the present collection apparatus is subjected to wave motion. Thus, there is obtained a relative motion between the collection chamber 1 and the undulating sea water due to wave motion. Thus, the sea water is allowed to move into and out of the collection chamber 1 periodically at high efficiency. With this structure, a relatively large amount of sea water is permitted to move into and out of the collection chamber 1 so that the collecting agent 3 has an increased chance of contacting fresh sea water, thereby increasing the efficiency of collecting a desired material, such as a metal, from the sea water by the collecting agent 3.

In addition, in accordance with the present invention, the amount of the collecting agent 3 contained in the collection chamber 1 can be determined arbitrarily in accordance with the various conditions, such as the wave characteristic of the local sea area where the present system is to be used and the size of the system, in applications. Thus, the collection chamber 1 may be fully packed with the collecting agent 3 in an extreme case, or the collection chamber 1 may be packed with the collecting agent 3 only partly, thereby defining a free space. Thus, the amount of the collecting agent 3 to be provided in the collection chamber 1 may be determined arbitrarily in view of the various conditions, including the average size of the collecting agent 3, the average pore size of the top and bottom porous walls 2, 2, and the wave characteristic of a local sea area in which the present system i to be used.

The collecting agent 3 to be used in the present system preferably includes a resin family material, such as an ion-exchange resin. Preferably, the collecting agent 3 includes a chelating resin material. It should also be noted that the collecting agent 3 may take any desired shape, such as grains, beads or filaments.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A semisubmersible system for collecting a desired material from sea water, comprising:
   a submersible, non-porous closed-loop side wall;
   a porous top wall fixedly attached to a top end of said side wall;
   a porous bottom wall fixedly attached to a bottom end of said side wall, whereby said side wall and said top and bottom walls define a collection chamber which is submerged under water during operation;
   a quantity of collecting agent contained in said collection chamber, said collecting agent collecting a desired material from sea water by contacting therewith;
   column means integrally mounted on and projecting upwardly from said collection chamber for forming with said collection chamber a semisubmersible structure, said column means projecting to a height above the sea surface during operation and having a total transverse cross sectional area substantially smaller than that of said collection chamber; and
   buoyancy force applying means submerged under water during operation for applying a buoyancy force to said system so as to keep said collection chamber submerged under water and substantially at a predetermined depth from the sea surface while keeping said column means projecting upwardly above the sea surface.

2. The system of claim 1, wherein said buoyancy force applying means includes a pair of buoyancy units which define part of said side wall and which are disposed opposite to each other.

3. The system of claim 2, wherein said closed-loop side wall is rectangular in shape, including a pair of lateral wall sections and a pair of end wall sections, and said pair of buoyancy units defines said pair of lateral wall sections.

4. The system of claim 1 further comprising: a platform mounted on said column means to be located above the sea surface.

5. The system of claim 4, wherein said column means includes a plurality of columns fixedly mounted at top of said side wall and extending upwardly above the sea surface and said platform is fixedly mounted on said plurality of columns and maintained horizontally.

6. The system of claim 1, wherein each of said top and bottom walls is formed by a net having a predetermined mesh size and said collecting agent has an average grain size which is larger than said mesh size.

7. The system of claim 1 including a free space in said collection chamber, said free space having a vertical height substantially equal to or larger than the amplitude of vertical motion of the sea water in which said semisubmersible structure operates.

8. The system of claim 1 wherein said collection agent has a specific weight substantially equal to that of the sea water in which said semisubmersible structure operates.

* * * * *